(12) United States Patent
Gu (10) Patent No.: US 6,529,855 B1
(45) Date of Patent: Mar. 4, 2003

(54) PRODUCE RECOGNITION SYSTEM AND METHOD

(75) Inventor: Yeming Gu, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/362,488

(22) Filed: Jul. 28, 1999

(51) Int. Cl.[7] .............................. G06K 9/46; G06K 9/66
(52) U.S. Cl. ........................ 702/155; 702/159; 382/190
(58) Field of Search ................................. 702/128, 155, 702/159; 382/190, 110; 356/328

(56) References Cited

U.S. PATENT DOCUMENTS

| 5,166,755 A | | 11/1992 | Gat | |
|---|---|---|---|---|
| 5,546,475 A | * | 8/1996 | Bolle et al. | 382/190 |
| 5,867,265 A | * | 2/1999 | Thomas | 356/328 |
| 6,005,959 A | * | 12/1999 | Mohan et al. | 382/110 |
| 6,075,594 A | * | 6/2000 | Thomas et al. | 356/328 |
| 6,345,109 B1 | * | 2/2002 | Souma et al. | 382/118 |

* cited by examiner

*Primary Examiner*—Marc S. Hoff
*Assistant Examiner*—Paul Kim
(74) *Attorney, Agent, or Firm*—Paul W. Martin (57) ABSTRACT

A produce recognition system and method which use a distance measure of likeness calculation to identify a produce item. The system includes a produce data collector, a library, and a computer. The produce data collector collects first data from the produce item. The library contains second data associated with classes of produce items. The computer reads the second data from a library, determines a distance measure of likeness value between the first data and each of the second data, determines third data and a corresponding class of produce items from the second data which produces a smallest distance measure of likeness value, and identifies the produce item to be within the corresponding class of produce items.

12 Claims, 7 Drawing Sheets

PRODUCE RECOGNITION SYSTEM AND METHOD

CROSS-REFERENCE TO RELATED APPLICATIONS

The present invention is related to the following commonly assigned and co-pending U.S. application:

"Produce Data Collector and Produce Recognition System", filed Nov. 10, 1998, invented by Gu et al., and having a Ser. No. 09/189,783.

BACKGROUND OF THE INVENTION

The present invention relates to product checkout devices and more specifically to a produce recognition system and method.

Bar code readers are well known for their usefulness in retail checkout and inventory control. Bar code readers are capable of identifying and recording most items during a typical transaction since most items are labeled with bar codes.

Items which are typically not identified and recorded by a bar code reader are produce items, since produce items are typically not labeled with bar codes. Bar code readers may include a scale for weighing produce items to assist in determining the price of such items. But identification of produce items is still a task for the checkout operator, who must identify a produce item and then manually enter an item identification code. Operator identification methods are slow and inefficient because they typically involve a visual comparison of a produce item with pictures of produce items, or a lookup of text in table. Operator identification methods are also prone to error, on the order of fifteen percent.

Therefore, it would be desirable to provide a produce recognition system and method. It would also be desirable to provide an accurate method of recognizing produce items.

SUMMARY OF THE INVENTION

In accordance with the teachings of the present invention, a produce recognition system and method are provided.

The system includes a produce data collector, a library, and a computer. The produce data collector collects first data from the produce item. The library contains second data associated with classes of produce items. The computer reads the second data from a library, determines a distance measure of likeness value between the first data and each of the second data, determines third data and a corresponding class of produce items from the second data which produces a smallest distance measure of likeness value, and identifies the produce item to be within the corresponding class of produce items.

A method of recognizing a produce item includes the steps of collecting first data from the produce item, reading a number of second data associated with a plurality of produce items including the one produce item from a library, determining a distance measure of likeness value between the first data and each of the second data, determining third data and a corresponding produce item from the second data which produces a smallest distance measure of likeness value, and identifying the produce item to be the corresponding produce item.

The identification step may optionally include the steps of ordering the distance measure of likeness values by size, displaying a list of the ordered distance measure of likeness values and corresponding names of produce items to an operator, and recording an operator choice for a produce item from the list.

The distance measure of likeness test for identifying produce items may be applied to other identification tasks in which sampled data is compared to reference data.

It is accordingly an object of the present invention to provide a produce recognition system and method.

It is another object of the present invention to provide a produce recognition system and method which identifies produce items by comparing their spectral data with the spectral data of items within classes of produce items.

It is another object of the present invention to define a distance measure of likeness (DML) value, which corresponds to the likelihood that an unknown instance is in a given class.

It is another object of the present invention to provide a produce recognition system and method which identifies produce items by sorting the distance measure of likeness (DML) values in ascending order and choosing the item with smallest distance as the most likely identification.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
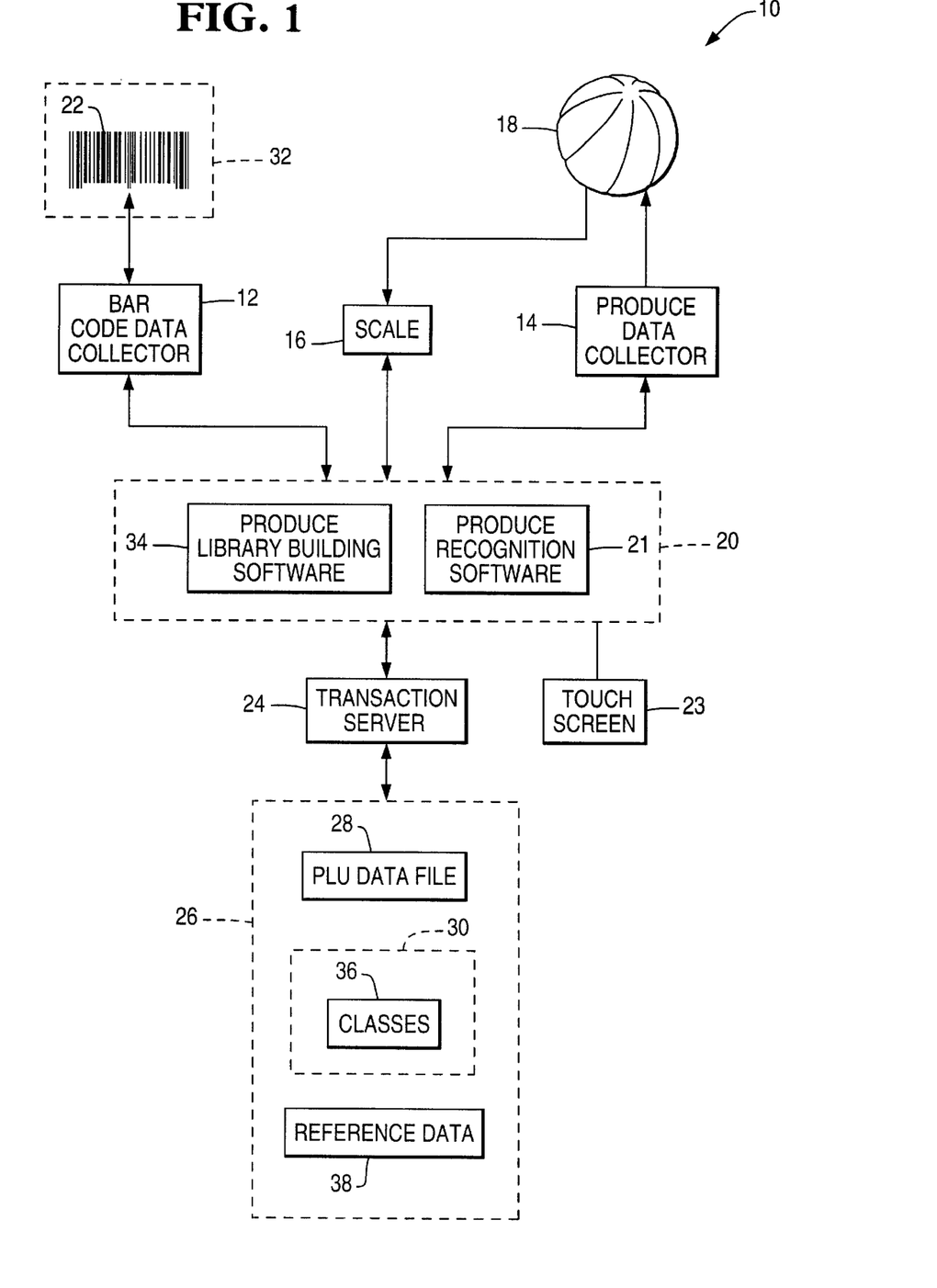
FIG. 1 is a block diagram of a transaction processing system including a produce recognition system.

Referring now to FIG. 1, transaction processing system 10 includes bar code data collector 12, produce data collector 14, and scale 16.

Bar code data collector 12 reads bar code 22 on merchandise item 32 to obtain an item identification number, also know as a price look-up (PLU) number, associated with item 32. Bar code data collector 12 may be any bar code data collector, including an optical bar code scanner which uses laser beams to read bar codes. Bar code data collector 12 may be located within a checkout counter or mounted on top of a checkout counter.

Produce data collector 14 collects data for produce item 18 or any other non-barcoded merchandise item. Such data may include color and color distribution data, size data, shape data, surface texture data, and aromatic data. Each sample of data represents an instance to be processed by produce recognition software 21.

Classification library 30 is a data library derived from previously collected and processed produce data. It contains information of different produce items, or classes, each of which is associated with a PLU number. In general, a classification library contains information of various classes 36, with each class 36 representing an identifiable produce item.

Reference data 38 is device-dependent data for data reduction steps. For example, data 38 includes calibration information and pixel-to-wavelength mapping and interpolation information used in the data reduction process.

During a transaction, operation of produce data collector 14 may be self-activated when produce item blocks the ambient light from entering window 60 (FIG. 2), or initiated by placement of produce item 18 on scale 16 or by operator commands recorded by touch screen 23 (or other input device).

Scale 16 determines a weight for produce item 18. Scale 16 works in connection with bar code data collector 12, but may be designed to operate and be mounted separately. Scale 16 sends weight information for produce item 18 to transaction terminal 20 so that transaction terminal 20 can determine a price for produce item 18 based upon the weight information.

Bar code data collector 12 and produce data collector 14 operate separately from each other, but may be integrated together. Bar code data collector 12 works in conjunction with transaction terminal 20 and transaction server 24.

In the case of bar coded items, transaction terminal 20 obtains the item identification number from bar code data collector 12 and retrieves a corresponding price from PLU data file 28 through transaction server 24.

In the case of non-bar coded produce items, transaction terminal 20 executes produce recognition software 21 which obtains produce characteristics from produce data collector 14, identifies produce item 18 by comparing produce data in classification library 30 with collected produce data, retrieves an item identification number from classification library 30 and a corresponding price from PLU data file 28.

In an alternative embodiment, identification of produce item 18 may be handled by transaction server 24. Transaction server 24 receives collected produce characteristics and compares them with produce data in classification library 30. Following identification, transaction server 24 obtains a price for produce item 18 and forwards it to transaction terminal 20.

Transaction terminal 20 (or other available computer connected to transaction terminal 20 through the in-store network) also executes produce library building software 34, which builds library 30.

Storage medium 26 preferably includes one or more hard disk drives. PLU data file 28 and classification library 30 are stored within storage medium 26, but either may also be located instead at transaction terminal 20, or bar code data collector 12. Reference data 38 is also stored within storage medium 26, but may also be stored within produce data collector 14.

To assist in proper identification of produce items, produce recognition software 21 may additionally display candidate produce items for operator verification. Produce recognition software 21 preferably arranges the candidate produce items in terms of probability of match and displays them as text and/or color images on an operator display of transaction terminal 20. The operator may accept the most likely candidate returned by or override it with a different choice.

Figure 2:
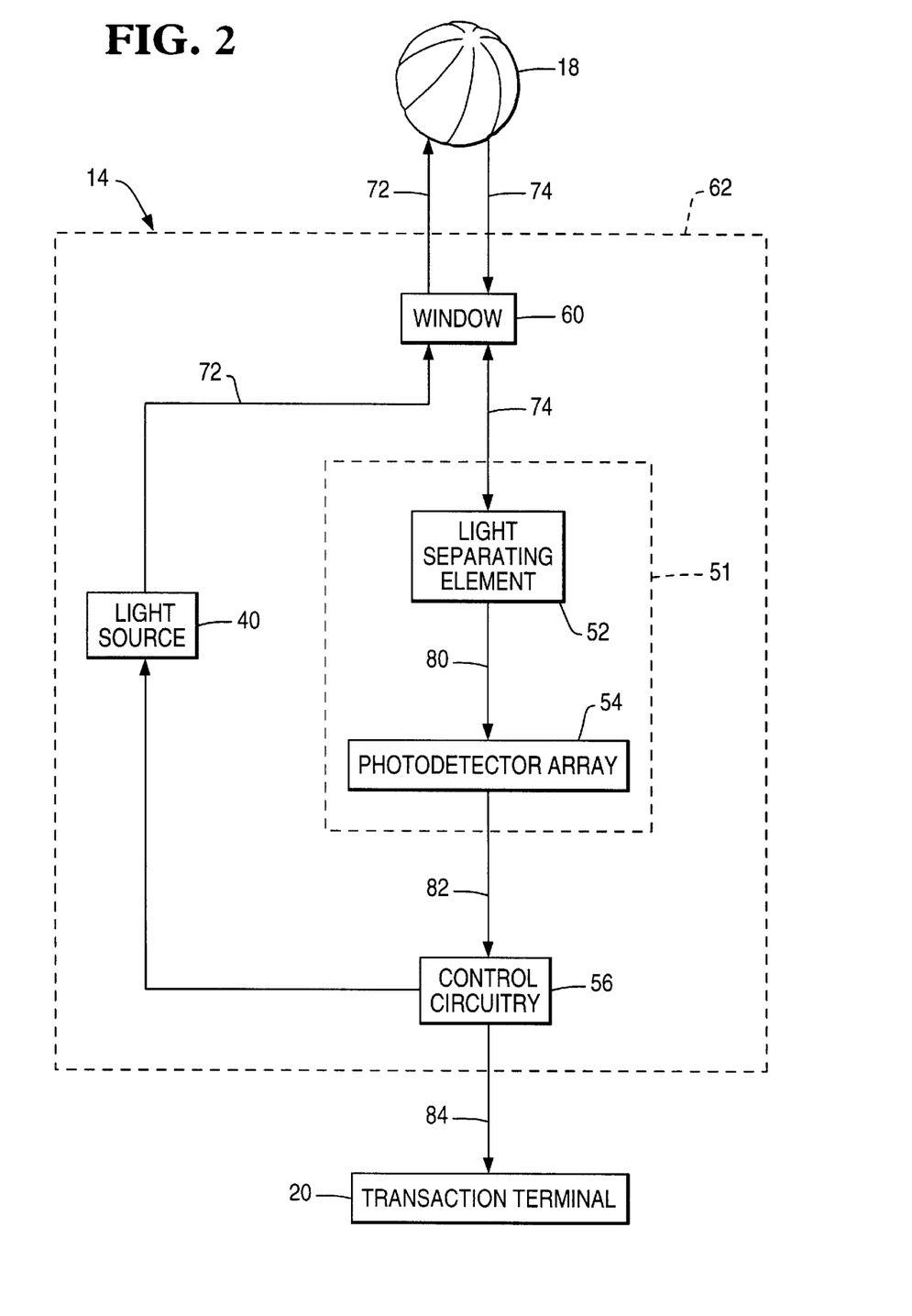
FIG. 2 is a block diagram of a type of produce data collector which collects spectral data.

Turning now to FIG. 2, an example produce data collector 14 which relies on spectroscopic analysis is illustrated. Other types of produce data collectors are also envisioned.

Example produce data collector 14 primarily includes light source 40, spectrometer 51, control circuitry 56, transparent window 60, and housing 62.

Light source 40 produces light 72. Light source 40 preferably produces a white light spectral distribution, and preferably has a range from four hundred 400 nm to 700 nm, which corresponds to the visible wavelength region of light.

Light source 40 preferably includes one or more light emitting diodes (LEDs). A broad-spectrum white light producing LED, such as the one manufactured by Nichia Chemical Industries, Ltd., is preferably employed because of its long life, low power consumption, fast turn-on time, low operating temperature, good directivity. Alternate embodiments include additional LEDs having different colors in narrower wavelength ranges and which are preferably used in combination with the broad-spectrum white light LED to even out variations in the spectral distribution and supplement the spectrum of the broad-spectrum white light LED.

Other types of light sources 40 are also envisioned by the present invention, although they may be less advantageous than the broad spectrum white LED. For example, a tungsten-halogen light may be used because of its broad spectrum, but produces more heat.

A plurality of different-colored LEDs having different non-overlapping wavelength ranges may be employed, but may provide less than desirable collector performance if gaps exist in the overall spectral distribution.

Spectrometer 51 includes light separating element 52, photodetector array 54.

Light separating element 52 splits light 76 in the preferred embodiment into light 80 of a continuous band of wavelengths. Light separating element 52 is preferably a linear variable filter (LVF), such as the one manufactured by Optical Coating Laboratory, Inc., or may be any other functionally equivalent component, such as a prism or a grating.

Photodetector array 54 produces waveform signals 82 containing spectral data. The pixels of the array spatially sample the continuous band of wavelengths produced by light separating element 52, and produce a set of discrete signal levels. Photodetector array 54 is preferably a complimentary metal oxide semiconductor (CMOS) array, but could be a Charge Coupled Device (CCD) array.

Control circuitry 56 controls operation of produce data collector 14 and produces digitized produce data waveform signals 84. For this purpose, control circuitry 56 includes an analog-to-digital (A/D) converter. A twelve bit A/D converter with a sampling rate of 22–44 kHz produces acceptable results.

Transparent window 60 includes an anti-reflective surface coating to prevent light 72 reflected from window 60 from contaminating reflected light 74.

Housing 62 contains light source 40, spectrometer 51, photodetector array 54, control circuitry 56, and transparent window 60.

In operation, an operator places produce item 18 on window 60. Control circuitry 56 turns on light source 40. Light separating element 52 separates reflected light 74 into different wavelengths to produce light 80 of a continuous band of wavelengths. Photodetector array 54 produces waveform signals 82 containing produce data. Control circuitry 56 produces digitized produce data signals 84 which it sends to transaction terminal 20. Control circuitry 56 turns off light source 40 and goes into a wait state.

Transaction terminal 20 uses produce data in digitized produce data signals 84 to identify produce item 18. Here, produce data consists of digitized waveforms which transaction terminal 20 compares to a library of digitized waveforms stored within classification library 30. After identification, transaction terminal 20 obtains a unit price from PLU data file 28 and a weight from scale 16 in order to calculate a total cost of produce item 18. Transaction terminal 20 enters the total cost into the transaction.

Classification library 30 is derived from previously collected and processed produce data. In general, a classification library contains information of various classes 36, with each class 36 representing an identifiable produce item. For example, bananas, golden delicious apples, and white potatoes are three different classes.

Each class 36 is uniquely identified by a class number, which may be associated with one or more PLU numbers. If a class number is associated with more than one PLU number, the additional PLU numbers represent a produce item which is similar except for different non-classifiable features. These features include cultivation methods (regular verses organic), ripening methods (regular verses vine-ripened or tree-ripened), seeded verses seedless, etc. Since non-classifiable features are normally not discernable by visually examining produce items, their identification will have to be accomplished using additional means, such as stickers, color-coded rubber bands, etc.

For a produce recognition system using a spectrometer alone, such as the one described in this invention, produce size becomes another non-distinguishable feature. Since most stores charge different prices for produce items which differ in these non-distinguishable features, such a class 36 contains produce items 18 having different price lookup (PLU) numbers.

There are two simple ways to process produce items 18 with non-distinguishable features. In the first method, a class 36 with multiple PLU numbers is expanded into multiple choices when presented to the operator in the user interface, and the operator identifies a produce item 18 by its non-distinguishable features.

A second method involves additional operator input. After the operator selects the correct class 36, produce recognition software 21 prompts the operator to enter non-distinguishable features for produce item 18, e.g., through a pop-up window on a graphic user interface.

In either case, produce recognition software 21 compares DML values between an unknown instance (i.e., waveform sample) and all classes 36 within library 30 to yield a list of candidates for produce item 18, beginning with the candidate having the smallest DML value.

While the sum of squared difference (SSD) is the simplest measure of distance between an unknown instance and instances of known items, the distance between an unknown instance and a class of instances is most relevant to the identification of unknown instances. A distance measure of likeness (DML) value provides a distance between an unknown instance and a class, with the smallest DML value yielding the most likely candidate.

In more detail, each instance is a point in the N-dimensional space, where N is the number of parameters that are used to describe the instance. The distance between points $p_1(x_{11}, x_{21}, \ldots, x_{N1})$ and $P_{2(x12)}, x_{22}, \ldots, x_{N2})$ is defined as $$d(P_1, P_2) = \sqrt{\sum_{i=1}^{N} (x_{i2} - x_{i1})^2}.$$

The distance between two instances, $d(P_1, P_2)$, measures how far apart the two instances are in the N-dimensional space. In the ideal case of well-defined classes 36, i.e., each class is represented by a single point in the N-dimensional space, produce identification is reduced to point matching: an instance P is identified as item j only if $d(P, P_j) = 0$.

In reality, there are always measurement errors due to instrumental noise and other factors. No two items of the same class are identical, and for the same item, the color and appearance changes over its surface area. The variations of orientation and distance of produce item 18 relative to window 60 further affect the measurements. All these factors contribute to the spreading of instance data in the N-dimensional space.

In a supermarket, a large number of instance points are measured from all the items of a class. There are enough instances from all items for all instance points to be spread in a practically definable volume in the N-dimensional space or for the shape and size of this volume to completely characterize the appearances of all the items of the class. The shape of this volume may be regular, like a ball in three dimensions, and it may be quite irregular, like a dumbbell in three dimensions.

Now if the unknown instance P happens to be in the volume of a particular class, then it is likely to be identifiable as an item of the class. There is no certainty that instance P is identifiable as an item in the class because there might be other classes 36 with their volumes overlapping this volume. So instance P could be simultaneously in the volumes of several classes 36. Therefore, the simple distance measure $d(P_1, P_2)$ above is not the best identification tool for such cases, since a class is characterized by a volume in N-dimensional, not by points.

A class is not only best described in N-dimensional space, but also is best described statistically, i.e., each instance is a random event, and a class is a probability density distribution in a certain volume in N-dimensional space.

Figure 3:
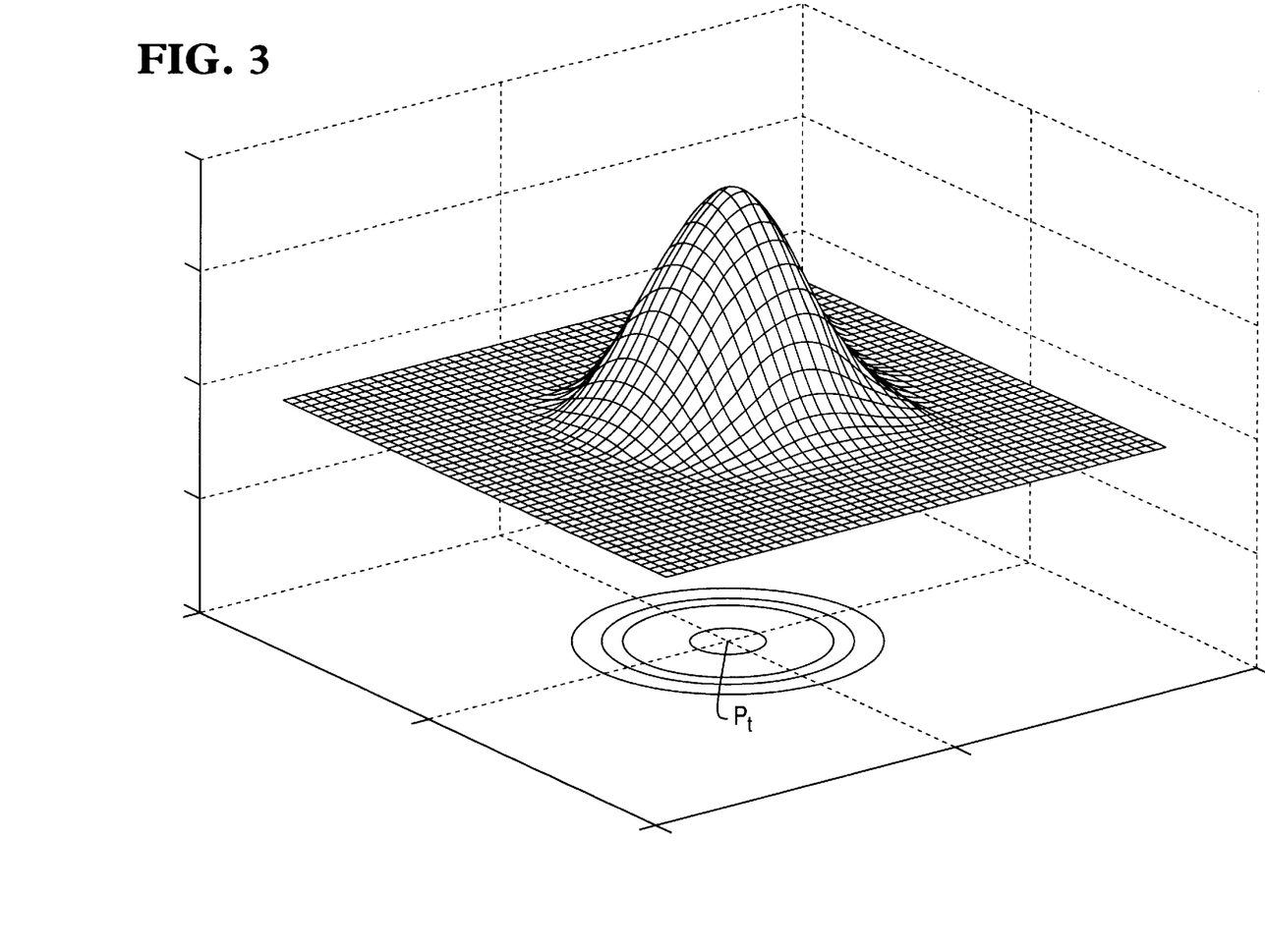
FIG. 3 is an illustration of a probability density distribution of random samples on a 2-dimensional plane.

As an example, consider randomly sampling items from a large number of items within the class "Garden Tomatoes". The items in this class have relatively well defined color and appearance: they are all red, but there are slight color variations from item to item, and even from side to side of the same item. However, compared to other classes 36, such as "Apples", there are much fewer item-to-item color variations. Since a typical tomato has a color which is "tomato red", a typical instance, $P_t$, associated with the typical tomato will be at or near the center of the N-dimensional volume of the class "Garden Tomatoes". Since items in the class have only slight color variations, most instances from a random sampling will be close to this typical instance Pt. Further away from instance $P_t$, fewer points will be found. Schematically this is illustrated in FIG. 3, where the probability density for finding a random event on the 2-dimensional plane is plotted as a mesh surface and also contoured at the bottom of the figure. The falling-off of probability density for a given class can be verified by looking at the histogram of the distances between instance $P_t$ and all the instance points that are randomly sampled for the class.

It is difficult to imagine, much less to illustrate, the relative positions and overlapping of classes 36 in N-dimensional space, where N is larger than three. So the following discussion starts in 2-dimensional space and extends to higher dimensions.

Figure 4:
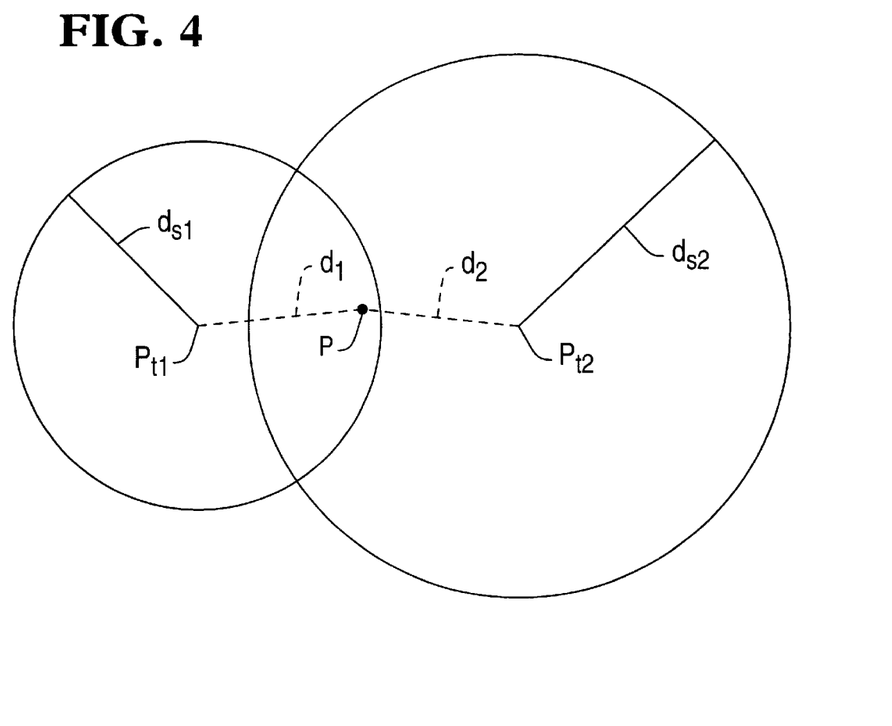
FIG. 4 is an illustration of symmetric 2-dimensional probability density distributions for two classes.

A first ideal example in 2-dimensional space is shown in FIG. 4. This example assumes that each class can be represented by a symmetric probability distribution, i.e., all contour lines in FIG. 3 are circles. Without knowing the actual shape of the distribution function (e.g., whether it is Gaussian or non-Gaussian), the distribution can be characterized by a typical distance scale $d_s$, which is a radius of one of the contour lines in FIG. 3. It can be regarded as a distance from the typical instance beyond which the probability density is significantly lower than inside it.

An unknown instance P happens to be in the overlapping area of two classes 36, $C_1$ and $C_2$. The unknown instance P could belong to either class. Using a simple distance measure does not help identify the likely class, since instance P is about equal distances $d_1$ and $d_2$ away from typical instances $P_{t1}$ and $P_{t2}$. However, under the assumption that the probability density is inversely proportional to distance relative to distance scale, instance P is more likely to belong to class $C_2$ than class $C_1$, since $$\frac{d_2}{d_{s2}} < \frac{d_1}{d_{s1}}. \quad (1)$$

Relative to the respective distance scale, instance P is closer to the typical instance $P_{t2}$ of class $C_2$ than to the typical instance $P_{t1}$ of class $C_1$.

Figure 5:
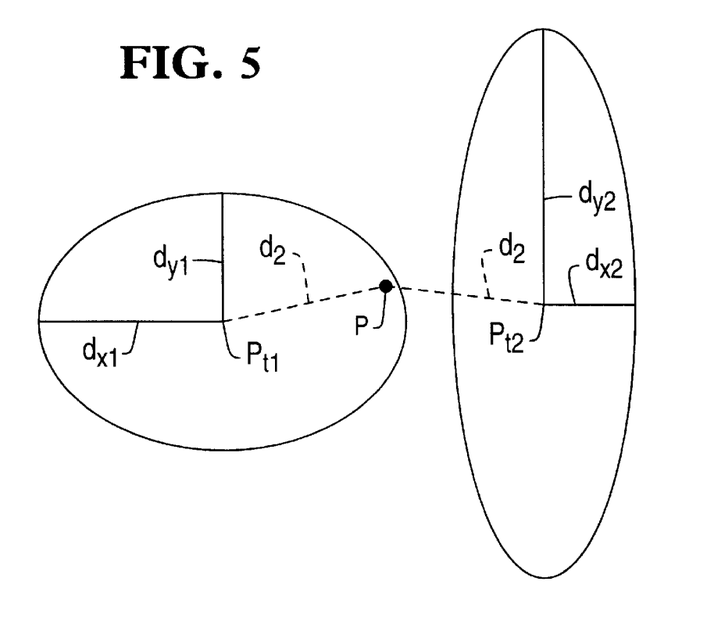
FIG. 5 is an illustration of asymmetric 2-dimensional probability density distributions for two classes of produce items.

A second example in 2-dimensional space is shown in FIG. 5. This example illustrates an asymmetric distribution, since the distribution may not always be symmetric. For example, if the distribution is due to measurement error, the error might be larger near the red end of the spectrum than the blue end. In fact, the intrinsic color variation of most classes 36 is non-uniform across the spectral range. For asymmetric distributions, a distance scale for the x- and y-dimensions must be defined.

Although the relative positions of $P_{t1}$, $P_{t2}$, and P are the same as in FIG. 4, the distribution of class $C_2$ is much narrower in x-dimension than the distribution of class $C_1$. Thus, instance P is much more likely to belong to class $C_1$ than class $C_2$.

A generalized distance measure for symmetric and asymmetric distributions in 2-dimensional space is herein defined. This distance measure is a Distance Measure of Likeness (DML) for an unknown instance P(x, y) relative to a class $C_j$:

$$D_j = \sqrt{\frac{(x - x_{tj})^2}{d_{xj}^2} + \frac{(y - y_{tj})^2}{d_{yj}^2}}, \quad (2)$$

where $P_{tj}(x_{tj}, y_{tj})$ is a typical instance of class $C_j$, and $d_{xj}$ and $d_{yj}$ are typical distance scales for class $C_j$ in x- and y-dimensions, respectively.

The following DML definition is extended to N-dimensional space:

$$D_j = \sqrt{\sum_{i=1}^{N} \frac{(x_i - x_{tij})^2}{d_{ij}^2}}, \quad (3)$$

where $P(x_1, x_2, \ldots, x_N)$ is an unknown instance, $P_{tj}(x_{t1j}, x_{t2j}, \ldots, x_{tNj})$ is a typical instance for the j-th class, $d_{ij}$ are the distance scales, and where $D_j$ is the distance measure between instance P and the class defined by typical instance $P_{tj}$ and the corresponding distance scales. In comparing unknown instance P with a library of typical instances $P_{tj}$, the class with the smallest DML value $D_j$ corresponds to the most likely identification.

Before a DML value may be calculated, the typical instance and the related distance scales must be determined. If each class has a relatively well-defined color and the instance-to-instance variations are mostly random, then the typical instance is well approximated by the average instance:

$$P_{tj}(x_{t1j}, x_{t2j}, \ldots, x_{tNj}) \approx \frac{\sum_{k=1}^{n_j} P_{jk}(x_{1jk}, x_{2jk}, \ldots, x_{Njk})}{n_j}, \quad (4)$$

where each class in library 34 is represented by a large number of randomly sampled instances, each instance is measured by N parameters, $n_j$ is the number of instances in the j-th class, and the j-th class in library 34 is represented by a group of $n_j$ points in N-dimensional space:

$$P_{jk}(x_{1jk}, x_{2jk}, \ldots, x_{Njk}), k=1,2,\ldots,n_j. \quad (5)$$

Each instance point $P_{jk}$ is actually a vector, and the sum $$\sum_{k=1}^{n_j} P_{jk}(x_{1jk}, x_{2jk}, \ldots, x_{Njk}) \quad (6)$$

is a vector sum. Thus, the distance scale for i-th dimension can be defined as the root-mean-square (rms) deviation of the i-th parameter:

$$d_{ij} = \sqrt{\frac{\sum_{k=1}^{n_j} (x_{ijk} - x_{tik})^2}{n_j}}. \quad (7)$$

In real applications, the instance point is defined by the reduced spectral data. While the raw, pixel based, data may be used for building a classification library, it is much preferred to reduce the data first because the raw data are usually strongly dependent on the specific device.

Figure 6:
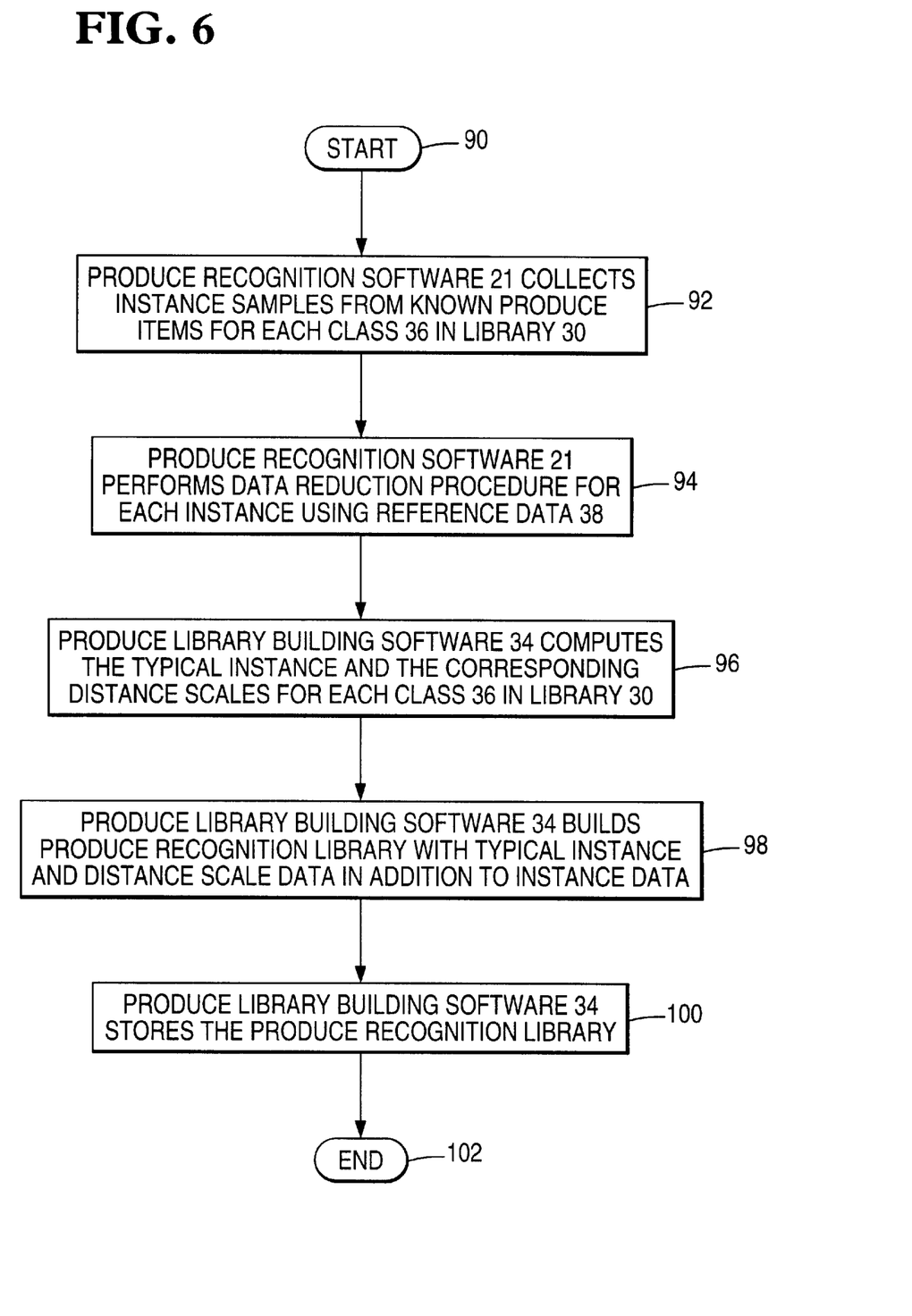
FIG. 6 is a flow diagram illustrating the library building process of the present invention.

Turning now to FIG. 6, a method of building a classification library, such as library 30, is illustrated in detail, beginning with START 90.

In step 92, produce recognition software 21 collects instance samples from known produce items 18 from each class 36 in library 30. Classes 36 are pre-defined.

Figure 8:
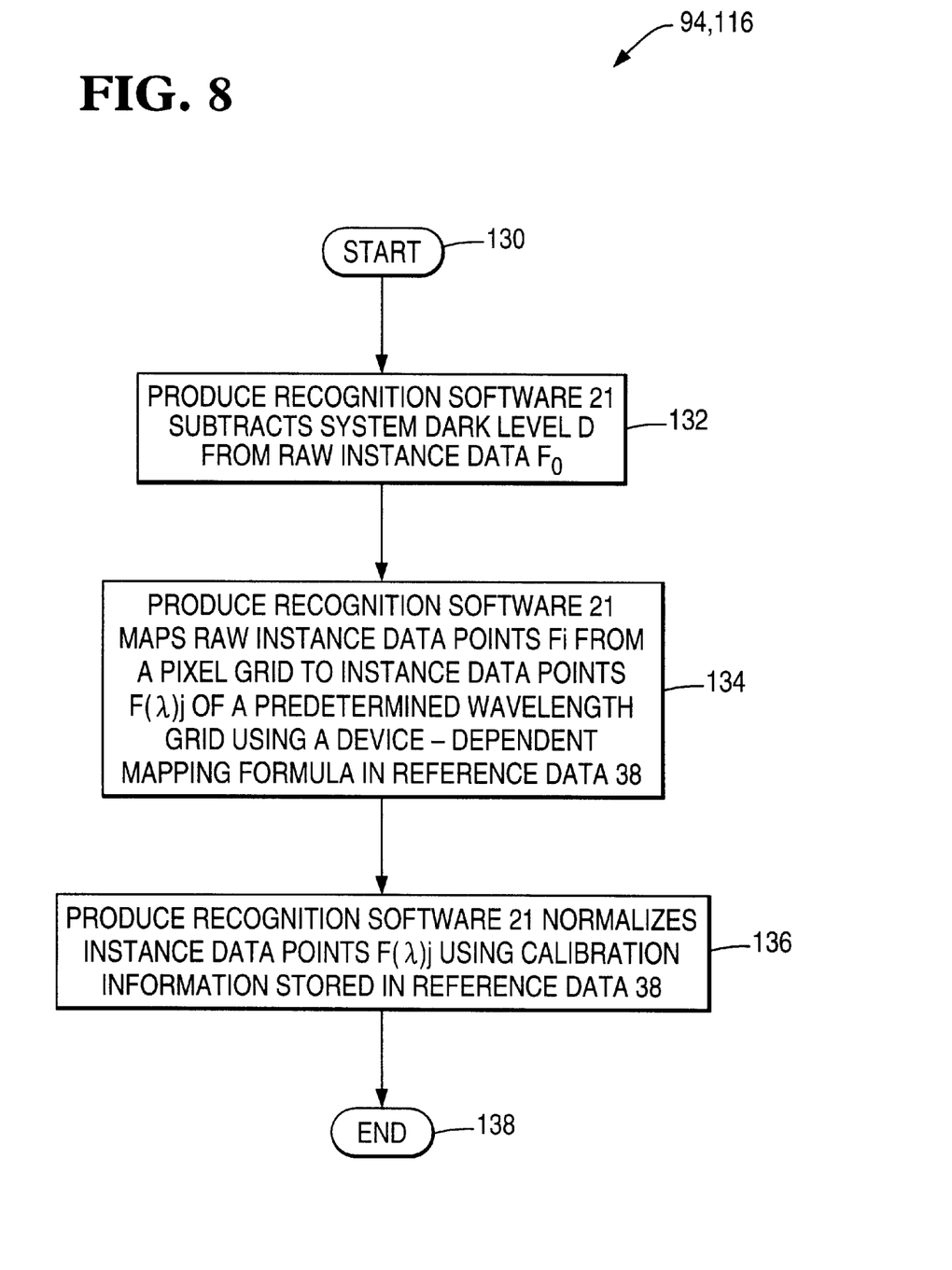
FIG. 8 is a flow diagram illustrating data reduction procedures.

In step 94, produce recognition software 21 performs a data reduction procedure for each instance using reference data 38 (FIG. 8).

In step 96, produce library building software 34 computes typical instances and corresponding distance scales for each class 36.

In step 98, produce library building software 34 builds library 34 with typical instance and distance scale data, in addition to the instance data.

In step 100, produce library building software 34 stores the library in storage medium 26 so that it may be loaded by produce recognition software 21.

Operation ends at step 102.

Figure 7:
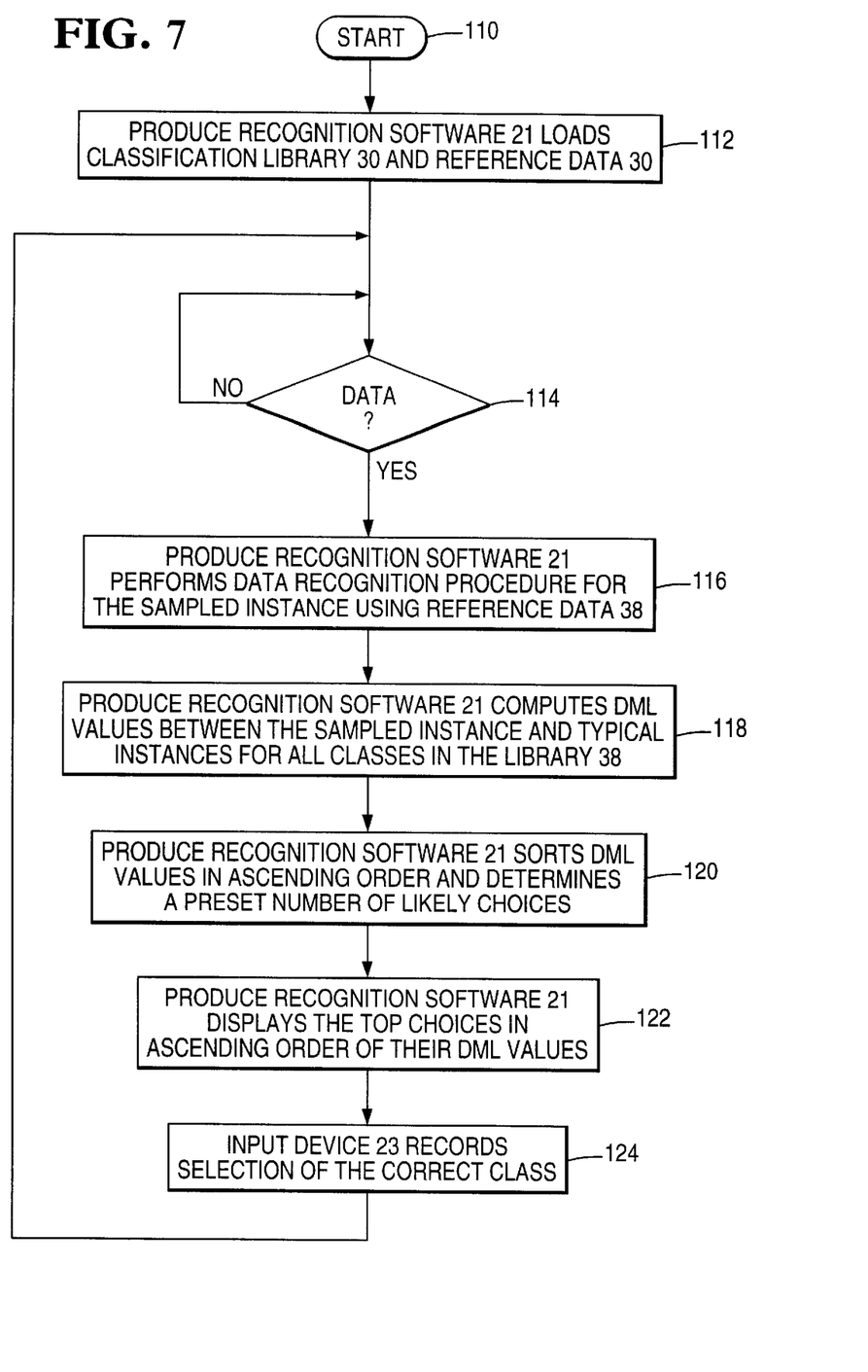
FIG. 7 is a flow diagram illustrating the recognition method of the present invention.

Turning now to FIG. 7, the produce recognition method of the present invention begins with START 110.

In step 112, produce recognition software 21 loads classification library 30 and reference data 38.

In step 114, produce recognition software 21 waits for data from produce data collector 14. Produce data collector 14 produces a sampled instance from an unknown produce item 18 following automatic or manual triggering. Operation proceeds to step 116 following produce data collection.

In more detail, produce data collector 14 illuminates produce item 18, splits light collected from produce item 18 into a plurality of different light portions having different wavelengths, converts energy in the plurality of light portions into a plurality of electrical signals, and digitizes the plurality of electrical signals to produce a digital spectrum. The sample spectrum represents a sampled instance.

In step 116, produce recognition software 21 performs data reduction on the sampled instance (FIG. 8).

In step 118, produce recognition software 21 computes DML values between the samples instance and typical instances for all classes in library 30.

In step 120, produce recognition software 21 sorts the DML values in ascending order and determines a predetermined number of likely choices.

In step 122, produce recognition software 21 displays the number of likely choices in ascending order of their DML values.

In step 124, produce recognition software 21 records an operator choice for produce item 18 through touch screen 23. Transaction terminal 20 uses the identification information to obtain a unit price for produce item 18 from transaction server 24. Transaction terminal 20 then determines a total price by multiplying the unit price by weight information from scale 16. Operation returns to step 114 to prepare for another produce item.

Turning to FIG. 8, a data reduction method used to build produce library 30 and process produce data during a transaction is illustrated beginning with START 130.

In step 132, produce recognition software 21 subtracts the system dark level D from the raw instance data $F_0$. Dark level D is the illumination level in produce data collector 14 with window 60 covered.

In step 134, produce recognition software 21 maps raw instance data points $F_i$ from a pixel grid to instance data points $F(\lambda)_j$ of a predetermined wavelength grid (e.g., 400 nm to 700 nm over 5 nm intervals) using a device-dependent mapping formula in reference data 38:

$$\overset{P}{\underset{1}{F_i}} \rightarrow \overset{N}{\underset{1}{F(\lambda_j)}},$$

where P is the number of pixels in the pixel grid and N is the number of preset wavelengths. The device-dependent mapping formula is stored in reference data 38. For an LVF, the device-dependent mapping formula is in the form $$\lambda = C_0 + C_1 \times x$$

where $C_0$ and $C_1$ are two constant factors.

In step 136, produce recognition software 21 normalizes instance data points $F(\lambda)_j$ using calibration information stored in reference data 38.

Calibration information includes reference spectrum $F_{ref}(\lambda)$ which is measured at various times throughout the operating life of produce data collector 14 using an external reference:

$$F_n(\lambda) = \frac{F(\lambda)}{F_{ref}(\lambda)},$$

where $F_n(\lambda)$ is the normalized data.

Calibration information may also include a correction factor $C_{dev}(\lambda)$, if instead, produce data collector 14 uses an internal reference and measures an internal reference spectrum $F'_{ref}(\lambda)$:

$$F_n(\lambda) = \frac{F(\lambda)}{C_{dev} F'_{ref}(\lambda)}.$$

In step 138, the process ends.

Advantageously, an analysis of DML values provides an appropriate measure for identifying produce items. The technique may be applied equally well to identify other items.

Although the invention has been described with particular reference to certain preferred embodiments thereof, variations and modifications of the present invention can be effected within the spirit and scope of the following claims. Specifically, while the DML algorithm developed in this invention was based on discussions of a special data type: spectral data, it may be applied to any data type or combination of data types with the same effect. That is, the instance point vector is just an abstract set of numbers, it may consist of one type or a number of different types of data: spectral data, physical dimensions, surface texture measures, weight, etc., and these data may be reduced in different ways or remapped to different spaces.

I claim:

1. A method of identifying an item comprising the steps of:

obtaining first data describing the item;

reading a number of second data associated with a plurality of items from a library;

determining a Distance Measure of Likeness value, $D_j$, between the first data and each of the second data, wherein the Distance Measure of Likeness value is defined by a first equation $$D_j = \sqrt{\sum_{i=1}^{N} \frac{(x_i - x_{tij})^2}{d_{ij}^2}};$$

wherein the Distance Measure of Likeness value, $D_j$, is a distance measure between an instance $P(x_1, x_2, \ldots, x_N)$ in the first data and one class j of a total number $n_j$ of the classes;

wherein the one class j is defined by a typical instance $P_{tj}(x_{t1j}, x_{t2j}, \ldots, x_{tNj})$ in N-dimensional space in the second data and corresponding distance scales $d_{ij}$ defined by a second equation $$d_{ij} = \sqrt{\frac{\sum_{k=1}^{n_j}(x_{ijk}-x_{tik})^2}{n_j}};$$

determining third data and a corresponding item name from the second data which produces a smallest Distance Measure of Likeness value; and identifying the item to be the corresponding item.

2. A method of recognizing a produce item comprising the steps of:

collecting first data from the produce item;

reading a number of second data associated with a plurality of produce items from a library;

determining a Distance Measure of Likeness value, $D_j$, between the first data and each of the second data, wherein the Distance Measure of Likeness value is defined by a first equation $$D_j = \sqrt{\sum_{i=1}^{N}\frac{(x_i - x_{tij})^2}{d_{ij}^2}};$$

wherein the Distance Measure of Likeness value, $D_j$, is a distance measure between an instance $P(x_1, x_2, \ldots, x_N)$ in the first data and one class j of a total number $n_j$ of the classes;

wherein the one class j is defined by a typical instance $P_{tj}(x_{t1j}, x_{t2j}, \ldots, x_{tNj})$ in N-dimensional space in the second data and corresponding distance scales $d_{ij}$ def ined by a second equation $$d_{ij} = \sqrt{\frac{\sum_{k=1}^{n_j}(x_{ijk}-x_{tik})^2}{n_j}};$$

determining third data and a corresponding produce item from the second data which produces a smallest Distance Measure of Likeness value; and identifying the produce the item to be the corresponding item.

3. The method as recited in claim 2, wherein the step of identifying comprises the substeps of:

ordering the Distance Measure of Likeness values by size;

displaying a list of the ordered Distance Measure of Likeness values and corresponding names of produce items to an operator; and recording an operator choice for a produce item from the list.

4. A method of recognizing a produce item comprising the steps of:

collecting first data from the produce item;

reading a number of second data associated with classes of produce items from a library;

determining a Distance Measure of Likeness value, $D_j$, between the first data and each of the second data, wherein the Distance Measure of Likeness value is defined by a first equation $$D_j = \sqrt{\sum_{i=1}^{N}\frac{(x_i - x_{tij})^2}{d_{ij}^2}};$$

wherein the Distance Measure of Likeness value, $D_j$, is a distance measure between an instance $P(x_1, x_2, \ldots, x_N)$ in the first data and one class j of a total number $n_j$ of the classes;

wherein the one class j is defined by a typical instance $P_{tj}(x_{t1j}, x_{t2j}, \ldots, x_{tNj})$ in N-dimensional space in the second data and corresponding distance scales $d_{ij}$ defined by a second equation $$d_{ij} = \sqrt{\frac{\sum_{k=1}^{n_j}(x_{ijk}-x_{tik})^2}{n_j}};$$

determining third data and a corresponding class of produce items from the second data which produces a smallest Distance Measure of Likeness value; and identifying the produce item to be within the corresponding class of produce items.

5. A method of recognizing a produce item comprising the steps of:

reading a library of reference produce data, including typical produce data for a plurality of different produce items;

initiating operation of a produce data collector;

collecting first data from the produce item;

performing data reduction on the first data to produce second data;

determining Distance Measure of Likeness values, $D_j$, between the second data and typical produce data, wherein the Distance Measure of Likeness values are defined by a first equation $$D_j = \sqrt{\sum_{i=1}^{N}\frac{(x_i - x_{tij})^2}{d_{ij}^2}};$$

wherein the Distance Measure of Likeness values, $D_j$, are distance measures between instances $P(x_1, x_2, \ldots, x_N)$ in the second data and one class j of a total number $n_j$ of the classes;

wherein the one class j is defined by a typical instance $P_{tj}(x_{t1j}, x_{t2j}, \ldots, x_{tNj})$ in N-dimensional space in the typical produce data and corresponding distance scales $d_{ij}$ defined by a first equation $$d_{ij} = \sqrt{\frac{\sum_{k=1}^{n_j}(x_{ijk}-x_{tik})^2}{n_j}};$$

sorting the Distance Measure of Likeness values by size;

building a list including a predetermined number of smallest Distance Measure of Likeness values and corresponding names of produce items;

displaying the list; and recording an operator choice for one of the names from the list.

6. A produce recognition system comprising:

a produce data collector which collects first data from a produce item;

a library containing second data associated with classes of produce items; and a computer which reads the second data from a library, determines a Distance Measure of Likeness value, $D_j$, between the first data and each of the second data, determines third data and a corresponding class of produce items from the second data which produces a smallest Distance Measure of Likeness value, and identifies the produce item to be within the corresponding class of produce items;

wherein the Distance Measure of Likeness value, $D_j$, is a distance measure between an instance $P(x_1, x_2, \ldots, x_N)$ in the first data and one class j of a total number $n_j$ of the classes;

wherein the one class j is defined by a typical instance $P_{tj}(x_{t1j}, x_{t2j}, \ldots, x_{tN})$ in N-dimensional space in the second data and corresponding distance scales $d_{ij}$ defined by a first equation $$d_{ij} = \sqrt{\frac{\sum_{k=1}^{n_j} (x_{ijk} - x_{tik})^2}{n_j}} \;;$$

wherein the Distance Measure of Likeness value, $D_j$, is defined by a second equation $$D_j = \sqrt{\sum_{i=1}^{N} \frac{(x_i - x_{tij})^2}{d_{ij}^2}} \;.$$

7. The produce recognition system as recited in claim 6, wherein the second data comprises:

produce data for produce items in the classes;

typical produce data for the classes; and typical distance scale data for typical produce data.

8. A produce recognition system comprising:

a produce data collector which collects first data from a produce item;

a library containing second data associated with classes of produce items;

a computer which reads the second data from a library, determines a Distance Measure of Likeness value, $D_j$, between the first data and each of the second data, determines third data and a corresponding class of produce items from the second data which produces a smallest Distance Measure of Likeness value, sorts the Distance Measure of Likeness values by size, builds a list including a predetermined number of smallest Distance Measure of Likeness values and corresponding classes of produce items, displays the list, and records an operator choice for one of the classes from the list;

wherein the Distance Measure of Likeness value, $D_j$, is a distance measure between an instance $P(x_1, x_2, \ldots, x_N)$ in the first data and one class j of a total number $n_j$ of the classes;

wherein the one class j is defined by a typical instance $P_{tj}(x_{t1j}, x_{t2j}, \ldots, x_{tNj})$ in N-dimensional space in the second data and corresponding distance scales $d_{ij}$ defined by a first equation $$d_{ij} = \sqrt{\frac{\sum_{k=1}^{n_j} (x_{ijk} - x_{tik})^2}{n_j}} \;;$$

wherein the Distance Measure of Likeness value, $D_j$, is defined by an equation $$D_j = \sqrt{\sum_{i=1}^{N} \frac{(x_i - x_{tij})^2}{d_{ij}^2}} \;.$$

9. A produce recognition system comprising:

collecting means for collecting first data from a produce item;

storage means containing second data associated with classes of produce items; and means for reading the second data from the storage means, determining a Distance Measure of Likeness value, $D_j$, between the first data and each of the second data, determining third data and a corresponding class of produce items from the second data which produces a smallest Distance Measure of Likeness value, and identifying the produce item to be within the corresponding class of produce items;

wherein the Distance Measure of Likeness value, $D_j$, is a distance measure between an instance $F(x_1, x_2, \ldots, x_N)$ in the first data and one class j of a total number $n_j$ of the classes;

wherein the one class j is defined by a typical instance $P_{tj}(x_{t1j}, x_{t2j}, \ldots, x_{tNj})$ in N-dimensional space in the second data and corresponding distance scales $d_{ij}$ defined by a first equation $$d_{ij} = \sqrt{\frac{\sum_{k=1}^{n_j} (x_{ijk} - x_{tik})^2}{n_j}} \;;$$

wherein the Distance Measure of Likeness value, $D_j$, is defined by an equation $$D_j = \sqrt{\sum_{i=1}^{N} \frac{(x_i - x_{tij})^2}{d_{ij}^2}} \;.$$

10. A method of building a library of item data for use in recognizing unknown items comprising the steps of:

defining classes for describing the items;

collecting instance samples from known items in each class;

determining typical instances for each class;

determining distance scales for the typical instances;

storing the typical instances and the distance scales in a library for later use in calculating Distance Measure of Likeness values, $D_j$, between the typical instances and instances associated with the unknown items;

wherein the Distance Measure of Likeness values, $D_j$, are distance measures between the instances $P(x_1, x_2, \ldots, x_N)$ associated with the unknown item and one class j of a total number $n_j$ of the classes;

wherein the one class j is defined by a typical instance $P_{tj}(x_{t1j}, x_{t2j}, \ldots, x_{tNj})$ in N-dimensional space and corresponding distance scales $d_{ij}$ defined by a first equation $$d_{ij} = \sqrt{\frac{\sum_{k=1}^{n_j}(x_{ijk} - x_{tik})^2}{n_j}} \; ;$$

wherein the Distance Measure of Likeness value, $D_j$, is defined by an equation $$D_j = \sqrt{\sum_{i=1}^{N} \frac{(x_i - x_{tij})^2}{d_{ij}^2}} \; .$$

11. The method as recited in claim 10, wherein the items are produce items.

12. A method of identifying an unknown item comprising the steps of:

obtaining first multiple dimensional data describing the unknown item;

reading second multiple dimensional data associated with a plurality of typical instances of a plurality of classes of known items from reference item data;

determining a Distance Measure of Likeness value, $D_j$, between the first data and each of the second data;

wherein the Distance Measure of Likeness value, $D_j$, is a distance measure between an instance $P(x_1, x_2, \ldots, x_N)$ in the first data and one class j of a total number $n_j$ of the classes;

wherein the one class j is defined by a typical instance $P_{tj}(x_{t1j}, x_{t2j}, \ldots, x_{tNj})$ in N-dimensional space in the second data and corresponding distance scales $d_{ij}$ defined by a first equation $$d_{ij} = \sqrt{\frac{\sum_{k=1}^{n_j}(x_{ijk} - x_{tik})^2}{n_j}} \; ;$$

wherein the Distance Measure of Likeness value, $D_j$, is defined by a second equation $$D_j = \sqrt{\sum_{i=1}^{N} \frac{(x_i - x_{tij})^2}{d_{ij}^2}} \; ;$$

determining third multiple dimensional data and a corresponding item identifier from the second multiple dimensional data which produces a smallest Distance Measure of Likeness value; and identifying the unknown item to be the corresponding item.

* * * * *

UNITED STATES PATENT AND TRADEMARK OFFICE
CERTIFICATE OF CORRECTION

PATENT NO.    : 6,529,855 B1
DATED         : March 4, 2003
INVENTOR(S)   : Gu, Y.

It is certified that error appears in the above-identified patent and that said Letters Patent is hereby corrected as shown below:

Column 13,
Line 19, delete "$P_{tj}(X_{t1j},X_{t2j}, \ldots ,X_{tN})$" and insert -- $P_{tj}(X_{t1j},X_{t2j}, \ldots ,X_{tNj})$ --.

Column 14,
Line 29, delete "$F(X_1, X_2, \ldots ,X_N)$" and insert -- $P(X_1, X_2, \ldots ,X_N)$ --.

Signed and Sealed this

Twenty-sixth Day of August, 2003

JAMES E. ROGAN
*Director of the United States Patent and Trademark Office*